United States Patent
Kühne

(12) 
(10) Patent No.: US 6,513,990 B2
(45) Date of Patent: Feb. 4, 2003

(54) COUPLING SLEEVE HAVING A SHIELDING PLATE

(75) Inventor: Wolfgang Kühne, Berlin (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/922,051

(22) Filed: Aug. 2, 2001

(65) Prior Publication Data

US 2002/0012503 A1 Jan. 31, 2002

Related U.S. Application Data

(63) Continuation of application No. PCT/DE00/00333, filed on Jan. 28, 2000.

(30) Foreign Application Priority Data

Feb. 2, 1999 (DE) .......................... 199 05 240

(51) Int. Cl.[7] ................................. G02B 6/38
(52) U.S. Cl. .................... 385/70; 439/607; 385/55; 385/71; 385/56; 385/58
(58) Field of Search .................... 385/53, 55, 70, 385/75, 71, 72, 60, 56, 58; 439/607, 608, 609

(56) References Cited

U.S. PATENT DOCUMENTS 4,641,907 A * 2/1987 Althouse et al. ............ 333/182
5,781,682 A * 7/1998 Cohen et al. ................. 385/89

FOREIGN PATENT DOCUMENTS

| DE | 42 29 511 C2 | 3/1994 |
| DE | 195 30 684 C1 | 2/1997 |
| EP | 0 689 069 A1 | 12/1995 |
| EP | 0 712 015 A2 | 5/1996 |
| EP | 0 788 022 A1 | 8/1997 |
| EP | 0 582 675 B1 | 12/1997 |
| WO | PCT/DE98/00994 | 11/1998 |

OTHER PUBLICATIONS

Braga et al.: "Design and Performance Advance in MT Connectors", Lightwave, Nov. 1997, pp. 61–67.

* cited by examiner

Primary Examiner—Hemang Sanghavi
Assistant Examiner—Scott Knauss
(74) Attorney, Agent, or Firm—Laurence A. Greenberg; Werner H. Stemer; Gregory L. Mayback

(57) ABSTRACT

A coupling sleeve is described which contains a sleeve body with a passage opening for accommodating a coupling partner on both ends respectively. An electroconductive shielding plate has a tongue protruding into the passage opening. The tongue is provided with an opening that has a width that matches a cross-section of a coupling partner.

4 Claims, 2 Drawing Sheets

COUPLING SLEEVE HAVING A SHIELDING PLATE

CROSS-REFERENCE TO RELATED APPLICATION

This application is a continuation of copending International Application No. PCT/DE00/00333, filed Jan. 28, 2000, which designated the United States.

BACKGROUND OF THE INVENTION

Field of the Invention

The invention relates to the field of detachable optical connections between two coupling partners. The coupling partners may, for example, be in the form of individual plug connectors and may each be terminated at the ends by one or more optical waveguides, in such a manner that the optical waveguides end at a coupling end face which is suitable for optical coupling to their opposite coupling partner. In the context of the present invention, the term optical waveguide refers to a conductor that is suitable for carrying and passing on an optical signal, such as a prefabricated optical waveguide cable, optical waveguide strips, or else optical conductors that are integrated or formed on a substrate. However, at least one of the coupling partners may also be formed by an appropriate connecting piece, for example of an optical transmitter or receiver.

The invention relates to a coupling sleeve having a sleeve body with a through-opening to accommodate a coupling partner at each of the two ends.

Such coupling sleeves are known both for individual plug connectors which each terminate a single optical waveguide end (see European Patent 0 582 675 B1) and for plug connectors which each hold and terminate a number of optical waveguide ends such that they can be coupled (see Published, European Patent Application EP 0 712 015 A2). In order to produce the desired optical connection, one coupling partner is in each case inserted from each end of the through-opening, so that the end faces of the coupling partners are opposite one another in the sleeve body. The sleeve bodies are frequently fitted to a partition wall or else to a rear wall of a housing that contains further electronic components. In the interest of interference-free operation, these components must also be protected against external electromagnetic interference influences when used for high-frequency data transmissions; furthermore, the emission of electromagnetic interference from the housing must be prevented. To this extent, the sleeve bodies and their openings in the respective wall form weak points from the shielding point of view.

German Patent DE 195 30 684 C describes an optical coupling configuration having a flange which forms a holding sleeve for accommodating a plug pin. A metal part, which is used inter alia for electromagnetic shielding, is embedded in the flange, forms a stop for the plug pin, and has at least one projection that protrudes out of the flange material. The coupling configuration described in German Patent DE 195 30 684 C allows only one optical plug connector to be coupled to it.

SUMMARY OF THE INVENTION

It is accordingly an object of the invention to provide a coupling sleeve having a shielding plate that overcomes the above-mentioned disadvantages of the prior art devices of this general type, by which two plug connectors can be coupled to one another, and which satisfies the stringent requirements for electromagnetic shielding.

With the foregoing and other objects in view there is provided, in accordance with the invention, a coupling sleeve. The coupling sleeve contains a sleeve body having two ends and a through-opening to accommodate a plug connector at each of the two ends. An electrically conductive shielding plate is disposed on the sleeve body. The electrically conductive shielding plate has a casing surrounding at least a part of a circumference of the sleeve body. The electrically conductive shielding plate further has a tongue projecting into the through-opening and the tongue has an aperture through which a coupling element of the plug connector can be passed.

The object is achieved according to the invention, for the coupling sleeve of the type mentioned initially, by the electrically conductive shielding plate having a casing which surrounds at least a part of the circumference of the sleeve body, in which the shielding plate has a tongue which projects into the through-opening and has an aperture through which a coupling element of one of the plug connectors can be passed.

A major advantage of the coupling sleeve according to the invention is that, without any significant additional complexity and, in particular, without any additional space being required, a coupling sleeve is provided which can ensure the coupling of the coupling partners with high electromagnetic shielding quality. The shielding plate that is integrated in the coupling sleeve provides an integral component, which is simple to handle. In this case, the opening or the aperture in the tongue is preferably dimensioned such that it accurately matches the unobstructed width of the cross section of at least one of the coupling partners, so that the through-opening has a weak point in the shielding which is reduced to the absolute minimum. This is because, when coupled, the aperture is then completely filled by the respective coupling partner.

For the purposes of the present invention, the term shielding plate in general refers to any electrically conductive flat material which, for example, can be formed by a plastic body with an electrochemically coated surface.

In order to make it simple to make contact between the shielding plate and a desired shielding potential, one preferred development of the invention provides for the shielding plate to have at least one connecting lug, which extends outside the sleeve body.

One development of the invention that is preferable for assembly purposes is for the casing of the shielding plate to have side sprung latching lugs.

Furthermore, the invention preferably provides for the tongue, the at least one connecting lug and the latching lugs to be integral components of a single shielding plate. Therefore, the shielding plate forms a unit that is easy to handle.

Other features which are considered as characteristic for the invention are set forth in the appended claims.

Although the invention is illustrated and described herein as embodied in a coupling sleeve having a shielding plate, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
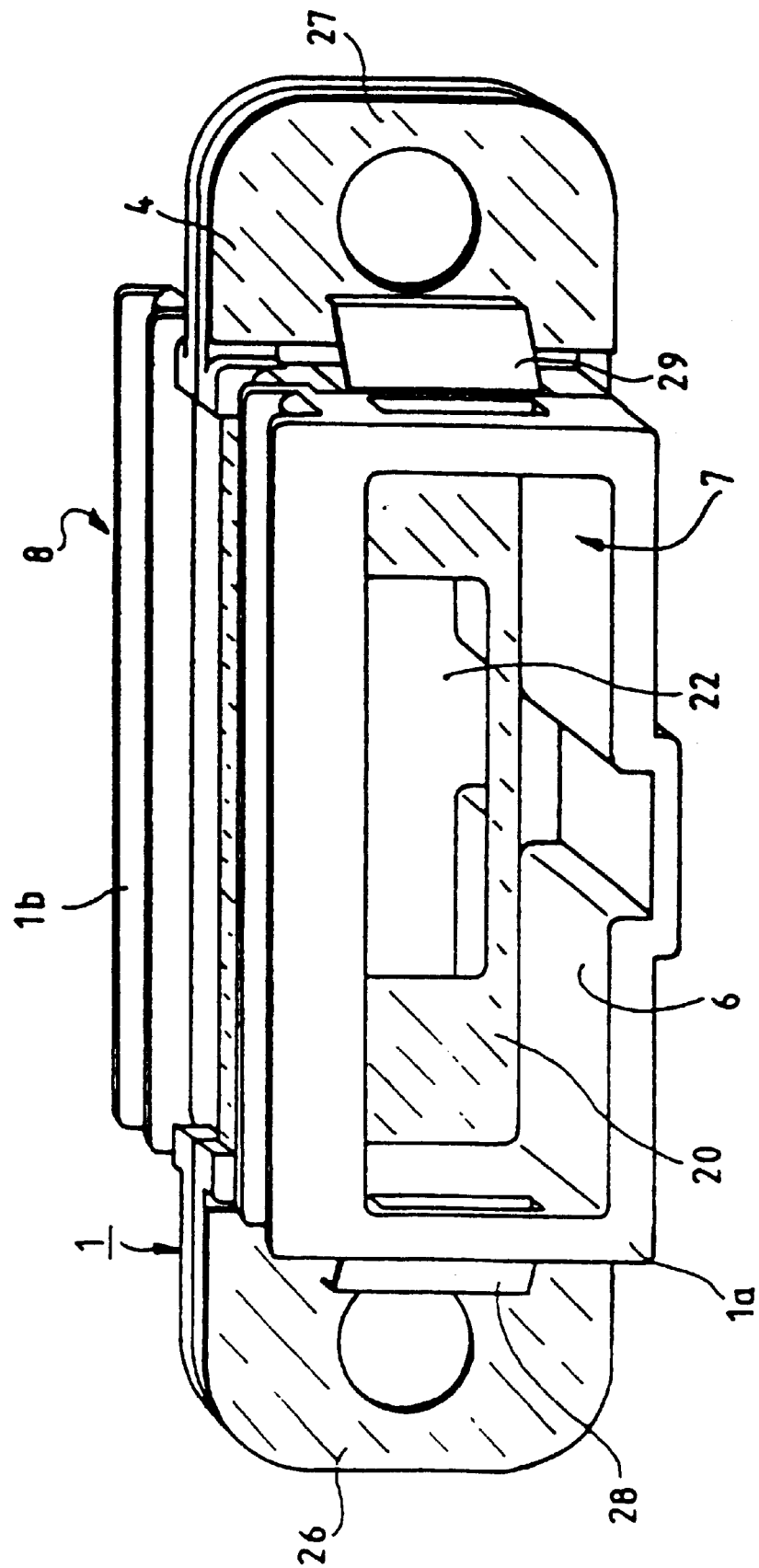
FIG. 1 is an enlarged, perspective view of a coupling sleeve, seen from an insertion side, according to the invention.

In all the figures of the drawing, sub-features and integral parts that correspond to one another bear the same reference symbol in each case. Referring now to the figures of the drawing in detail and first, particularly, to FIG. 1 thereof, there is shown a coupling sleeve that has a sleeve body 1 which is composed of two essentially mirror-image symmetrical sleeve body halves or sleeve body parts 1a, 1b. An electrically conductive shielding plate 4 is disposed between the sleeve body halves 1a, 1b, and is illustrated lightly shaded, only in order to illustrate it better. The sleeve body 1 has a through-opening 6, which extends from a front end 7 of the sleeve body 1 to a rear end 8 of the sleeve body 1. A coupling partner can in each case be inserted into each end 7, 8.

Figure 2:
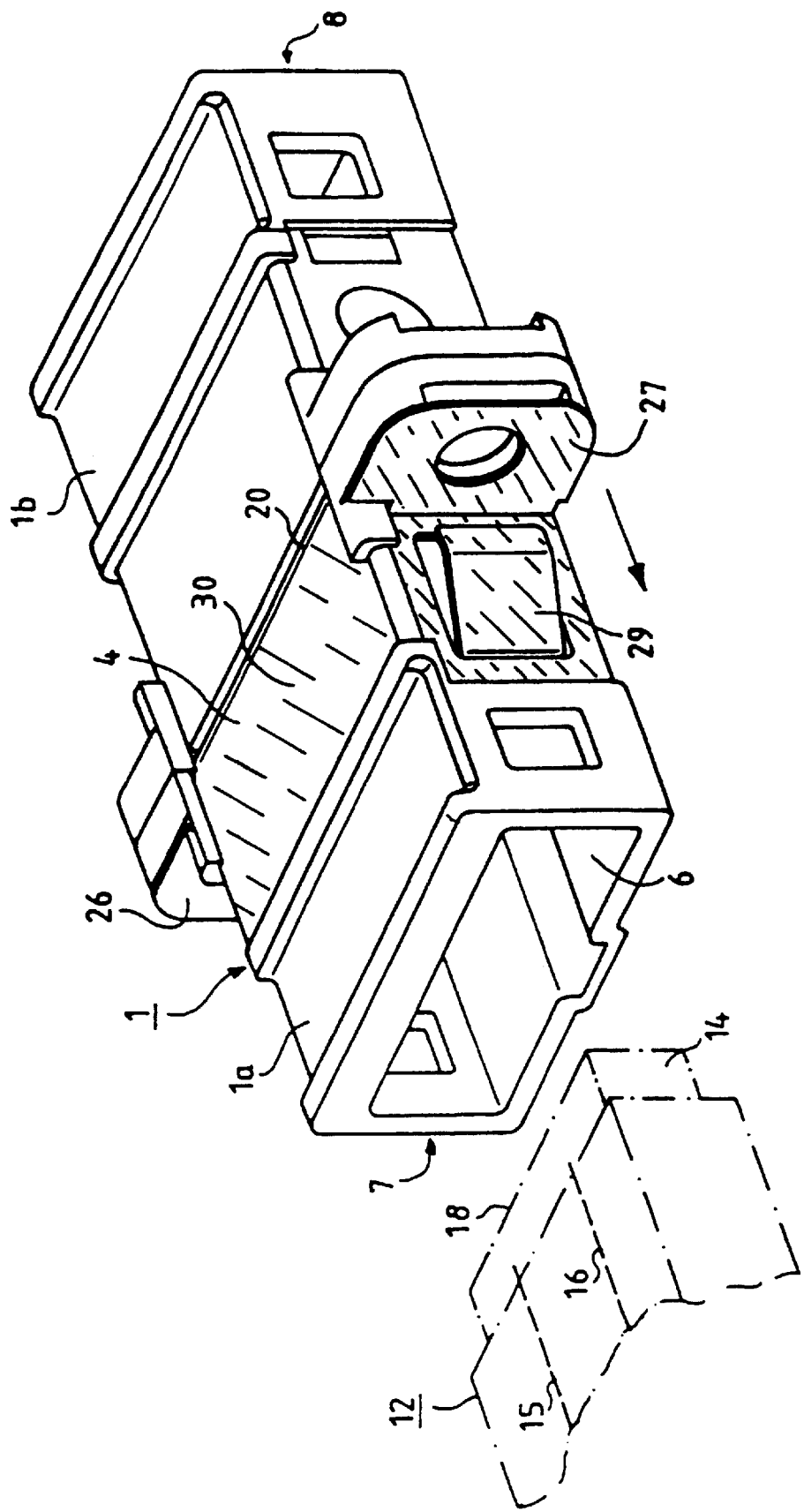
FIG. 2 is a perspective view of the coupling sleeve from the side.

FIG. 2 shows only one of the coupling partners 12, which may be formed as a plug connector that is known per se. The plug connector 12 may contain what is referred to as an MT plug pin 14 (MT ferrule) as a coupling element as is described, for example, in the reference "Lightwave", November 1997, pages 61 to 67. A plug pin 14 terminates an optical waveguide 15, 16, 15 which is illustrated only indicatively, at its end face 18 such that it is ready to be coupled.

As shown in FIG. 1, a tongue 20 is a component of the shielding plate 4 and is angled essentially at right angles to the through-opening 6. The tongue 20 has an aperture or an opening 22, whose unobstructed width is dimensioned to correspond to the cross section of the front-face region (plug pin 14) of the coupling partner 12. When the coupling partner 12 is inserted, the opening 22 is thus completely filled by the plug pin 14.

The electrically conductive shielding plate 4 extends out of the sleeve body 1 at both ends of the sleeve body 1, and in each case has a connecting lug 26, 27. The shielding plate 4 can be electrically connected to the desired shielding potential via the connecting lugs 26, 27, for example by a screw connection. Furthermore, at the side, the shielding plate 4 has sprung latching lugs 28, 29, by which the coupling sleeve 1 can be latched in a corresponding recess (for example in an appliance rear wall). To this end, when the coupling sleeve 1 is being inserted, the sprung latching lugs 28, 29 are pressed toward the through-opening 6 into an opening, for example in a rear wall, which is not shown in FIG. 2, in order for then to spring open once again behind the edge of the rear-wall opening. As shown in FIG. 2, the shielding plate 4 has a casing 30 which surrounds at least a part of the circumference of the sleeve body 1 and thus ensures complete peripheral shielding. The major components of the shielding plate 4 described above, namely the tongue 20 which is bent approximately at right angles, the connecting lugs 26, 27 and the latching lugs 28, 29, are advantageously integral components of a single plate 4, so that only a single additional component that is used for shielding and, possibly, for assembly, is required. The shielding plate 4 that is connected to the halves 1a and 1b forms a unit that is easy to handle and is integral.

It is also feasible to dispose two (or more) coupling sleeves according to the invention alongside one another so that, for example, duplex plug connectors can also be coupled.

I claim:

1. A coupling sleeve, comprising:
   a sleeve body having two ends and a through-opening formed therein to accommodate a plug connector at each of said two ends; and
   an electrically conductive shielding plate disposed on said sleeve body, said electrically conductive shielding plate having a casing surrounding at least a part of a circumference of said sleeve body, said electrically conductive shielding plate further having a tongue projecting into said through-opening and said tongue having an aperture formed therein through which a coupling element of the plug connector can be passed.

2. The coupling sleeve according to claim 1, wherein said electrically conductive shielding plate has at least one connecting lug extending outside of said sleeve body.

3. The coupling sleeve according to claim 2, wherein said casing of said electrically conductive shielding plate has side sprung latching lugs.

4. The coupling sleeve according to claim 3, wherein said tongue, said at least one connecting lug and said side sprung latching lugs are formed as integral components of said electrically conductive shielding plate.

* * * * *